United States Patent Office 3,472,390
Patented Oct. 14, 1969

3,472,390
MARINE SEWAGE DISPOSAL METHOD AND APPARATUS
David B. Pall, Roslyn Estates, and David Rosenberg, Glen Cove, N.Y., assignors to Pall Corporation, Glen Cove, N.Y., a corporation of New York
Filed Sept. 20, 1967, Ser. No. 669,051
Int. Cl. C02c 1/00, 1/40
U.S. Cl. 210—62
14 Claims

ABSTRACT OF THE DISCLOSURE

A method and apparatus are provided for rapidly disposing of marine sewage in which human body waste is pulverized in the presence of a disinfectant into colloidal size particles to form a stable colloidal suspension that within a very short period can be safely dumped overboard.

---

This invention relates to a marine sewage disposal method and apparatus, and more patricularly, it relates to a marine sewage disposal method and apparatus in which the sewage is disinfected and all solid waste particles are reduced to a very small size for efficient disinfection and rapid disposal.

Large seagoing vessels and large inland boats travelling on rivers and the like are not free to dump untreated sewage into the water without first both reducing the BOD (biochemical oxygen demand) of the sewage and disinfecting it to a bacterial count below 1000 coliforms per 100 ml. water.

In order to reduce the BOD of the sewage, it is necessary to equip the vessel with expensive and large sewage treatment equipment in which the sewage undergoes digestion, normally aerobic digestion, and, subsequently, the effluent liquid undergoes clarification. Relatively large aeration baths and sedimentation tanks are required, and the treatment unit itself must be of substantial capacity to hold a quantity of sewage for a sufficient length of time to enable digestion to take place. Such apparatus, of course, are too large for small vessels. Indeed, in many instances, such aerobic sewage apparatus are almost as large as a small marine vessel itself.

In writing the water pollution control laws, the authorities have taken cognizance of the fact that the BOD of the sewage of a small vessel is rather insignificant when compaded to the BOD capacity of a body of water. In fact, a body of water can almost immediately recover the oxygen lost in the digestion of the sewage from the surrounding atmosphere. Thus the water pollution control laws have been written to provide that if they are of relatively small size (less than 40 persons in capacity), seagoing vessels and vessels travelling on certain large inland lakes need not be equipped with elaborate sewage treatment equipment. The sewage dumped from the small marine vessels need only be disinfected to below 1000 coliforms per 100 ml. of water, and should contain no floating unsightly particles. No reduction in BOD is required.

The term "sewage" as used herein refers inter alia to a mixture of human body waste and water.

One device which took advantage of the fact that no reduction in the BOD of the sewage is necessary on small marine vessels is shown in U.S. Patent No. 2,709-680 to Watson. The device disclosed pulverizes sewage, applied a disinfectant thereto, and then retains the sewage for at least two hours. Due to the fact that sewage is retained for a substantial length of time, the apparatus must be large and of a sufficient capacity to hold a large amount of sewage. Moreover, means such as automatic shut-off valves must be provided to ensure that sewage will not be forced from the assembly by action of the pulverizer before it is disinfected.

In accordance with this invention, an apparatus and a process are provided in which sewage is rapidly disinfected and reduced to a disposable form without the necessity of providing a large and complicated apparatus.

Naturally, the more rapidly the sewage can be treated and disposed of, the less time the sewage need be retained in the apparatus, and the smaller the apparatus can be. In addition, the less opportunity and tendency there is for solid particles to settle in the apparatus, the more trouble free the operation of the apparatus will be.

In accordance with these objectives an apparatus is provided for rapidly disinfecting marine sewage for disposal overboard, which comprises, in combination, an influent line for delivering human body waste and water; pulverizing means communicating with the influent line to receive the mixture of human body waste, water; means for supplying disinfectant to the pulverizing means for mixing with the body waste and water such that solid material in the sewage is pulverized in the presence of the disinfectant, said pulverizing means being adapted to reduce solid material in the waste to an average colloidal particle size of less than about 100 microns and preferably less than about 10 microns and form a homogeneous, stable suspension of the solid waste particles in the water and disinfectant mixture; a holding reservoir communicating with the downstream side of the pulverizing means for receiving the suspension therefrom and holding the suspension until the sewage is disinfected; and vent means for dumping the sewage overboard.

The process of this invention comprises mixing together water, disinfectant, and human body waste; pulverizing the solid material in the human body waste in the presence of the disinfectant and water to an average colloidal particle size of less than about 100 microns and preferably less than about 10 microns to form a stable homogeneous suspension of colloidal human body waste particles in the water and disinfectant mixture, and retaining the suspension for a period of from less than about 1 minute to about 15 minutes to render it disinfected.

By the provision of the above method and apparatus, sewage is disinfected in a very short time to a coliform level at which it is suitable for disposal. This is due to the pulverization or mashing of the solid material in the sewage to an average colloidal particle size of less than about 100 microns and preferably less than 10 microns. The small particles form a stable, colloidal suspension. Since the pulverization of the solid waste into very small particles is carried out in the presence of the disinfectant, small particles are intimately contacted with the disinfectant and fully exposed to the action thereof, and extremely rapid disinfection of the sewage occurs. Thus, it is possible to discharge the sewage within 15 minutes at a maximum. Therefore, the apparatus can be very compact and the probability is reduced to a minimum that sewage that has not been fully treated will be discharged, due to an overload of the apparatus.

There are many advantages obtained by the instant process and the apparatus, These will be pointed out in the following description.

The disinfectant can be any disinfectant known to those skilled in the art. Iodine is preferred. However, chlorine, bromine and calcium hypochlorite can also be conveniently used. In the case of iodine, concentrations of 100 to 150 p.p.m. are acceptable. There is no critical maximum, and it is desirable to employ concentrations of 300 p.p.m., or more, to saturate the water with the iodine.

The disinfectant can be added to the water by dissolution for example, from a stack or column of iodine crystals, disposed in the influent water line, upstream of the toilet, such that water runs through the stack when the toilet is flushed. The size of the column will determine the time it takes for the water to pass through it. Thus the column should be large enough in cross-sectional area to obtain the desired concentration of iodine in the water. Other dispensers or chemical feeders which inject or dispense the appropriate amount of disinfectant into the water before the sewage is pulverized can also be used. The disinfectant can be added directly into the influent line for mixing with the sewage therein or it can be added to the pulverizer such that the disinfectant is mixed with the sewage upon or just prior to pulverization.

From the toilet the mixture of human body waste, water, and disinfectant flows through the influent sewage line, preferably into an influent sewage reservoir. The influent reservoir can be a vessel, an enlarged portion of the line, or merely a series of convolutions in the sewage line, which can retain a quantity of sewage, water and disinfectant until it can be pulverized by the pulverizing mechanism.

It is desirable to provide means in the influent reservoir to prevent a surge of influent sewage from disrupting the action of the pulverizer. This can be done by providing two or more vessels in series, with a valve between them, or providing a single vessel having a dividing wall or a baffle thereacross, with a valve associated therewith to permit sewage to pass the pulverizer only at selected intervals.

A sewage reservoir upstream of the pulverizer is unnecessary if a pulverizer of high enough capacity is provided. The pulverizer in this case should be of sufficient capacity to accommodate the entire influent flow of sewage from the vessel at all times.

The pulverization of the sewage material in the disinfectant is preferably accomplished by a colloid mill.

The colloid mill preferably comprises a milling rotor having a smooth milling portion and slotted cutting portion. The rotor rotates in a matching stationary milling member which surrounds the rotor, and has slotted and smooth portions similar to those of the rotor. A narrow space of the order of 0.010 inch to about 0.050 inch is provided between the smooth portions of the rotor and the stationary member through which pass waste particles. As the solid waste material passes through the smooth narrow passage, each particle is reduced to an average colloidal size of less than about 100 microns and preferably less than about 10 microns. This is accomplished by the high hydraulic shear forces of the mixture created in the narrow passage by the milling action of the rotor and stationary member. The pulverized waste forms a stable homogeneous colloidal suspension in the disinfectant and water mixture.

As the body waste is pulverized by the action of the colloid mill, it is dispersed in the disinfectant solution. This ensures that each small solid waste particle is fully exposed to and acted upon by the disinfectant as it is pulverized.

Naturally, before the solid waste particles can flow through the narrow smooth passage, they must be reduced to particles of a size that can fit in the passage. This can be done by the slotted portions of the mill which cut relatively large solid waste particles into smaller particles. The slots can be formed as a series of cutting edges each closely spaced from each other. The slots are normally disposed in a manner to direct the sewage particles into the narrow smooth portion of the mill.

It is also desirable to provide a comminutor to break up even larger waste particles and to shred paper and the like before it reaches the pulverizing means. The comminutor can comprise several cutting blades which are fixed to the main drive shaft of the mill and extend upstream of the slots. This will reduce particles too large in size for the slots before they reach the slots. The cutting blades, however, need not be used. A conventional comminutor can also be provided in the apparatus, upstream of the pulverizing means and downstream of the toilet.

Means for pulverizing the sewage and forming an aqueous suspension of the solid waste material other than a colloid mill can be employed. A colloid mill is preferred since it can conveniently reduce the particles to the appropriate size and at the same time act as the means to pump the sewage and disinfectant through the system. However, any means which can reduce the solid particles to the colloidal sizes referred to above would be suitable. This can be accomplished by means which cut, macerate, chew, grind, mash or mill the solid waste material to the particle dimensions specified above.

By pulverization of the waste material, while it is in contact with the disinfectant, the disinfectant action is greatly enhanced. This is due to the fact that the surface area of the waste material exposed to the disinfectant is greatly increased and contact takes place on a microscopic scale. This means that each fragment, or minute particle of waste material is contacted by the disinfectant upon pulverization. Therefore, the disinfectant action takes place quite rapidly. In fact, it is possible to discharge the suspension from the vessel after a retention time of within the range from less than about 1 minute to about 15 minutes.

After the sewage leaves the puverizer, it can be passed to a holding reservoir. This is preferably a vessel which is provided with a series of baffles to delay the passage of the sewage. The baffle construction provides a long flow path through the tank. The appropriate length for the flow path can be calculated from the rate of flow and the desired retention time. Moreover, a convoluted flow path such as provided by baffles ensures a uniform retention time. Thus, when sewage is discharged from the vessel, it will have been retained in the holding reservoir for a sufficient time to ensure that it is disinfected to the desired coliform level.

The holding reservoir, however, need not be fitted with baffles. It can be a tank or vessel of almost any configuration that is of sufficient size to hold the sewage for enough time for it to become disinfected.

It is also possible to employ as the holding reservoir a series of long convoluted pipes or ducts which extend the passage time through the system and delay the sewage in the boat until disinfected. The colloidal sewage particles are normally discharged directly into the water from the holding reservoir through a pipe or vent. The effluent contains no unsightly floating particles. Moreover, the small effluent particles provide food for the lower forms of marine life.

A further advantage obtained by the reduction of waste particles to the minute size specified above is that a stable suspension is formed. Thus, there is no tendency for the colloidal waste particles to settle from the suspension in the holding reservoir and the holding reservoir requires little maintenance or supervision.

A preferred embodiment of this invention is described in connection with the following drawings, in which.

Figure 1:
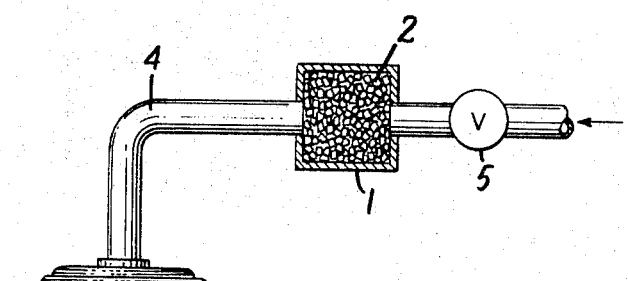
FIGURE 1 is a view in cross-section of a sewage disposal unit in accordance with this invention.
Figure 1:
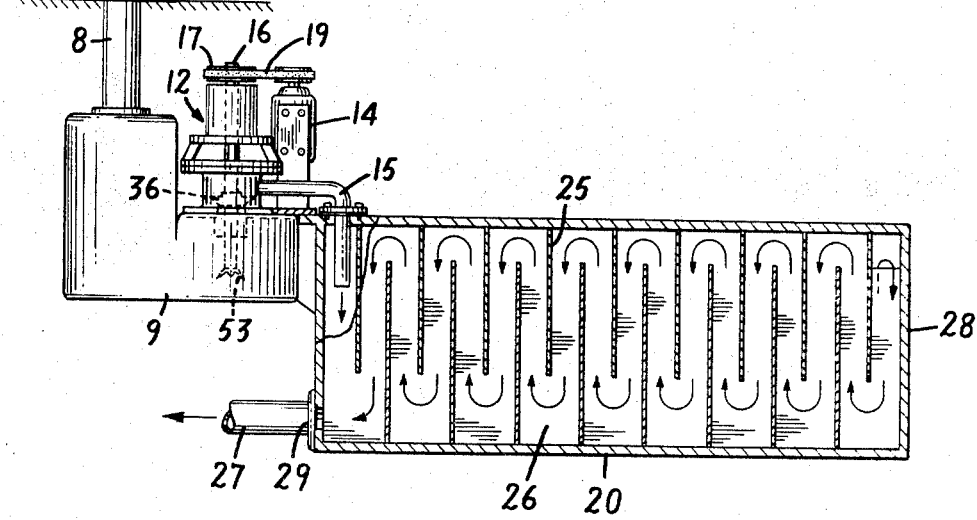
Figure 2:
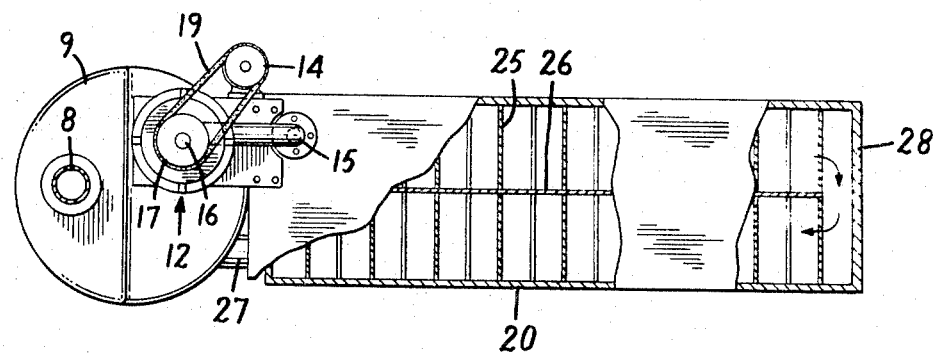
FIGURE 2 is a top view of the apparatus shown in FIGURE 1.

The sewage disposal apparatus shown in FIGURE 1 comprises an iodine feed column 1 containing a charge of iodine crystals 2. The feed column 1 is connected to a toilet 3 by a line 4. A valve 5 is provided upstream of the feed column for the flow of water therethrough to the toilet. A sewage line 8 carries sewage and the iodine solution from the toilet to a chamber 9. This chamber comprises the influent sewage reservoir which receives the mixture of sewage, water, and disinfectant from the toilet, and retains it momentarily prior to the pulverization of the solid sewage material. If desired, a comminutor can be provided in the chamber 9 in the line of flow to ensure that all large waste particles are broken up before they encounter the pulverizer.

An outlet 10 is provided in the chamber and the pulverizing mechanism 12 is located at this outlet. In order for fluid or solid waste material to pass from the chamber 9, it must pass through the pulverizing mechanism. The pulverizing means comprises a colloid mill, which can best be seen by reference to FIGURE 3. The colloid mill communicates with and extends into a line 15 leading to a retention reservoir 20. The drive shaft 16 of the colloidal mill 12 extends through the line 15 and is provided with a pulley 17. The pulley is linked to an electric motor 14 by a drive belt 19. The structure of the colloid mill is described in greater detail hereinafter.

The line 15 leads to the holding reservoir 20 which is a rectangular tank having a plurality of baffles 25 therein. The baffles 25 extend across the tank to form a convoluted lengthened flow path in the tank, to extend time required for flow of the pulverized sewage suspension therethrough. The tank is provided with a central divider 26, which separates the tank into two sections. Sewage flows from the line 15 over and under the baffles in one section of the tank, until it reaches the end 28 of the tank. It then crosses over to the opposite direction over and under the baffles until it reaches the outlet 29, and is discharged from the assembly through a vent line 27.

Figure 3:
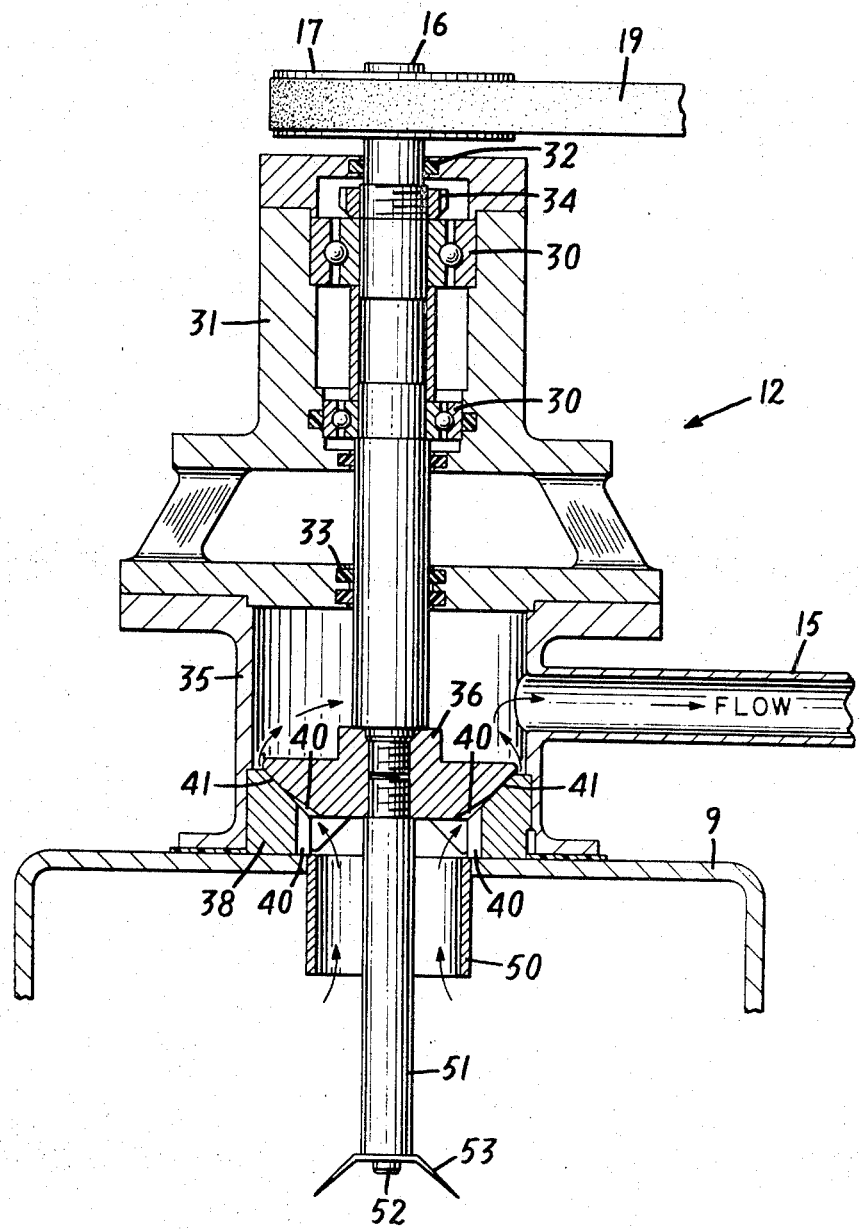
FIGURE 3 is an enlarged view in cross-section of the pulverizing mechanism used in the apparatus shown in FIGURE 1.

The colloid mill 12 is shown in detail in FIGURE 3. The drive shaft is supported by two bearings 30 in a collar 31. The collar 31 abuts a housing 35 which encloses the milling mechanism and permits communication between the reservoir 9 and the line 15. A seal 32 is provided at the upper end of the collar 31 to prevent leakage of fluid from the collar. A seal 33 is provided at the opposite end of the collar at its juncture with the housing 35. This seal 33 prevents any leakage from the housing 35 into the collar 31. A nut 34 is located between the upper bearing 30 and the seal 32, to prevent longitudinal displacement of the drive shaft 16. The pulverizing mechanism of the mill comprises a rotating beveled milling member 36, and a correspondingly beveled stationary member 38. These members have portions which are smooth and closely spaced apart to form a narrow annular passage 41 between the two members. This passage is less than 0.010 inch wide.

The solid sewage particles are reduced in this portion to an average colloidal size of less than about 10 microns by the hydraulic shear forces that occur in the narrow passage due to the action of the milling members 36 and 38.

The milling members 36 and 38 are also provided with matching cutting slots 40 which lead into the narrow passage 41. These slots cut and chop the solid waste particles to a size which permits them to enter the narrow passage 41. A flow guide 50 surrounds a stub 51 of the shaft 16 and directs flow to the slots 40. Several cutting blades 53 are fixed to the end of the stub 51 by a screw 52 to shred and cut any particles which are too large for the slots 40.

In operation, when the toilet is flushed, the valve 5 is opened, permitting water to flow in the line 4 through the iodine crystals column 2, through the toilet 3, and into the tank 9, carrying along human body waste from the toilet. The stack of iodine crystals imparts an iodine concentration of 150 p.p.m. to the water as water flows through it and dissolves a portion of the crystals. The flow of the iodine solution and solid waste material then proceeds from the tank 9 to the pulverizing apparatus 12. The blades 53 and the slots 40 reduce the particles into successively smaller sizes. The particles are then finally reduced to a colloidal size by passing through the narrow passage 41 between the rotary member 36 and the stationary member 38. The shear stresses due to the fluid forces in the passage 41 reduce the particles to an average size of less than about 10 microns, and form a colloidal suspension. Intimate contact between the small sewage particles and the disinfectant occurs as pulverization of the particles takes place. The sewage then proceeds through the line 15 into the tank 20. It then flows over and under the baffles 25 until it reaches the end of the tank 28. It then reverses direction and flows again over and under the baffles to the outlet 29, where it is discharged through the line 27 into the water. The residence time of the sewage in the vessel is about 6 minutes.

The instant apparatus and method are simple and rapidly reduce the coliform level of the sewage to a value acceptable for discharge. There is no settling of the sewage particles in the apparatus and maintenance of the apparatus is minimal.

The present apparatus and method have been described in connection with the disposal of human body waste. However, it also is possible to employ the instant invention for the disposal of other organic wastes that must be disposed of on a small vessel such as galley waste.

Having regard to the foregoing disclosure, the following is claimed as the inventive and patentable features thereof:

1. An apparatus for rapidly disinfecting sewage, comprising, in combination, an influent sewage line for delivering solid human body waste and water; pulverizing means communicating with the influent sewage line to receive the mixtureo f human body waste, and water; means for supplying disinfectant to the pulverizing means for mixing with the human body waste and water such that solid material in the sewage is pulverized in the presence of the disinfectant, said pulverizing means comprising a rotary member and a member cooperating therewith and closely spaced therefrom to define therebetween a narrow passage through which waste must pass, said passage being sufficiently narrow so that upon rotation of the rotary member hydraulic shear forces are generated in the passage which reduce the solid waste to an average colloidal particle size of less than about 100 microns and form a stable, homogeneous, aqueous suspension of the solid waste particles; a holding reservoir communicating with the downstream side of the pulverizing means for receiving the suspension therefrom, and holding the suspension until the sewage is disinfected; and vent means for disposal of the disinfected sewage.

2. An apparatus in accordance with claim 1, in which the pulverizing means comprises a colloid mill.

3. An apparatus in accordance with claim 1, in which the pulverizing means comprises a rotary milling member and a stationary milling member having matching slotted and smooth portions which cooperate to pulverize the solid waste material to colloidal particle size upon rotation of the rotary member.

4. An apparatus in accordance with claim 1, including an influent sewage reservoir located between and communicating with the influent line and the pulverizing means for receiving human body waste, water and disinfectant mixture.

5. An apparatus in accordance with claim 1, in which the holding reservoir is provided with a series of baffles which define a convoluted flow path therein.

6. An apparatus in accordance with claim 1, in which a comminutor is provided upstream of the pulverizing means for reducing large waste particles to such size that they can be accommodated by the pulverizing means.

7. An apparatus in accordance with claim 1, in which a chemical feeder is provided to dispense a predetermined amount of disinfectant into the influent sewage line.

8. An apparatus in accordance with claim 7 in which the chemical feeder includes a stack of disinfectant crystals in the line of water flow to the first sewage reservoir.

9. An apparatus for rapidly disinfecting marine sewage for disposal overboard comprising, in combination, an influent sewage reservoir, an influent sewage line leading to the reservoir in a manner to deliver thereto a mixture of human body waste and water; a disinfectant feeder communicating with the influent sewage line, adapted to dispense a quantity of disinfectant into the water and waste mixture in the influent sewage reservoir; a colloid mill communicating with the influent sewage reservoir and in the line of flow therefrom, said colloid mill having a milling rotary member, and a milling stationary member, each member having cooperating smooth portions and cutting portions, said smooth portions being spaced from each other to define a narrow smooth passage in which solid human body waste in the presence of a disinfectant is reduced in size to an average colloidal particles of less than about 100 microns in diameter by the hydraulic shear forces created in the passage upon rotation of the rotary milling member to form a stable, aqueous, homogeneous colloidal suspension of waste particles; a holding reservoir communicating with the colloid mill to receive the colloidal suspension therefrom, said holding reservoir having a plurality of baffles therein defining a convoluted flow path adapted to retain the suspension until the sewage is disinfected; and a vent means for dumping the disinfected sewage overboard.

10. An apparatus in accordance with claim 9, including a comminutor in the sewage reservoir upstream of the colloid mill to reduce large waste particles to a size that can be accommodated by the colloid mill.

11. A process for disinfecting sewage comprising mixing together water, disinfectant and human body waste; passing the mixture through a narrow passage defined between a rotary member and a member cooperating therewith and closely spaced therefrom; generating hydraulic shear forces in said passage by rotation of said rotary member which pulverize the solid waste in the presence of the disinfectant and water mixture to an average colloidal particle size of less than about 100 microns to form a stable homogeneous aqueous suspension of colloidal waste particles; and retaining the suspension for a period of from less than about 1 to 15 minutes until disinfected.

12. A process in accordance with claim 11, in which the disinfectant is iodine.

13. A process in accordance with claim 11, in which the particles are reduced to less than about 10 microns in diameter during pulverization.

14. A process in accordance with claim 11 in which sewage is comminuted prior to entry into said passage.

References Cited

UNITED STATES PATENTS

| 2,709,680 | 5/1955 | Watson | 210—152 X |
| 2,901,114 | 8/1959 | Smith et al. | 210—7 X |
| 3,044,077 | 7/1962 | Belden | 4—10 |
| 3,170,637 | 2/1965 | Nowlin | 241—15 |
| 3,275,550 | 9/1966 | Daubenspeck | 210—60 |
| 3,323,650 | 6/1967 | Kilbane | 210—152 |
| 3,361,369 | 1/1968 | Ruble | 241—46 |

FOREIGN PATENTS 970,667  9/1964  Great Britain.

OTHER REFERENCES

Black, A. P., et al., Use of Iodine for Disinfection, Jour. AWWA, vol. 57, November 1965, pp. 1401 and 1404–1406 relied on.

MICHAEL E. ROGERS, Primary Examiner

U.S. Cl. X.R.

4—10; 23—311; 210—152; 241—46